United States Patent
Walker et al.

(10) Patent No.: US 10,599,598 B1
(45) Date of Patent: Mar. 24, 2020

(54) PCIE WRITE REQUEST ACKNOWLEDGMENT

(71) Applicant: Hewlett Packard Enterprise Development LP, Houston, TX (US)

(72) Inventors: Shawn K. Walker, Fort Collins, CO (US); Derek A. Sherlock, Boulder, CO (US); Gary Gostin, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/134,499

(22) Filed: Sep. 18, 2018

(51) Int. Cl.
*G06F 13/38* (2006.01)
*G06F 13/40* (2006.01)
*G06F 13/42* (2006.01)
*G06F 3/06* (2006.01)
*H04L 29/08* (2006.01)

(52) U.S. Cl.
CPC ............ *G06F 13/385* (2013.01); *G06F 3/067* (2013.01); *G06F 3/0619* (2013.01); *G06F 3/0661* (2013.01); *G06F 13/4022* (2013.01); *G06F 13/4221* (2013.01); *H04L 67/26* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 5,918,055 A | * | 6/1999 | Crawford | G06F 9/50 710/1 |
| 7,003,615 B2 | | 2/2006 | Chui | |
| 8,099,564 B1 | | 1/2012 | Kulkarni | |
| 8,271,604 B2 | * | 9/2012 | Freimuth | G06F 12/145 709/213 |
| 8,891,542 B2 | * | 11/2014 | DeCusatis | H04L 49/351 370/401 |
| 9,019,975 B2 | * | 4/2015 | DeCusatis | H04L 49/351 370/401 |
| 9,747,245 B2 | * | 8/2017 | Guddeti | G06F 11/3027 |
| 9,934,192 B2 | * | 4/2018 | Shen | G06F 13/4027 |
| 2008/0147959 A1 | * | 6/2008 | Freimuth | G06F 12/1009 711/100 |

(Continued)

OTHER PUBLICATIONS

'PCI Express Base Specification Revision 1.0a' Apr. 15, 2003. (Year: 2003).*

(Continued)

*Primary Examiner* — Steven G Snyder
(74) *Attorney, Agent, or Firm* — Hewlett Packard Enterprise Patent Department

(57) ABSTRACT

A PCIe (Peripheral Component Interconnect Express) protocol converter for connection to a central processing unit (CPU) node having a root complex, a CPU memory fabric and CPU memory may include independent PCIe links, a fabric interface and a fabric switch connected to the fabric interface. Each of the links may include an endpoint for connection to the root complex. The fabric switch is connected to the fabric interface of each of the links and is connectable to a remote node. The fabric switch transmits writes of a single write request from the remote node across both links. Each fabric interface is to transmit an acknowledgment to the remote node in response to a write of the writes becoming observable at the CPU node hi Michael, hi Michael,.

17 Claims, 9 Drawing Sheets

(56) References Cited

U.S. PATENT DOCUMENTS

| | | |
|---|---|---|
| 2011/0055439 A1 | 3/2011 | Chen |
| 2014/0169369 A1* | 6/2014 | DeCusatis ............ H04L 49/351 |
| | | 370/392 |
| 2014/0169371 A1* | 6/2014 | DeCusatis ............ H04L 49/351 |
| | | 370/392 |
| 2016/0179738 A1* | 6/2016 | Guddeti ............. G06F 11/3027 |
| | | 714/56 |
| 2016/0210075 A1* | 7/2016 | Frank ...................... G06F 3/061 |
| 2016/0357695 A1* | 12/2016 | Johnston ............ G06F 13/4027 |
| 2017/0286355 A1* | 10/2017 | Shen ................... G06F 13/4027 |
| 2018/0067877 A1 | 3/2018 | Balkan |
| 2018/0077086 A1 | 3/2018 | Guim Bernat |

OTHER PUBLICATIONS

'Programmable PCI-Express Root Port Bifurcation—IBM Technical Disclosure' Apr. 14, 2014. (Year: 2014).*

Gen-Z Read and Writes, Oct. 2017, <https://genzconsortium.org/wp-content/uploads/2017/08/1711_Gen-Z-Reads-and-Writes.pdf>.

* cited by examiner

PCIE WRITE REQUEST ACKNOWLEDGMENT

This invention was made with Government support under Prime Contract No. DE-AC52-07NA27344 awarded by DOE. The Government has certain rights in this invention.

BACKGROUND

PCIe (Peripheral Component Interconnect Express) is a high-speed serial computer expansion bus standard or protocol. The PCIe protocol may be utilized for communications with respect to a compute node. Other compute nodes may employ different bus protocols. Communication between a compute node using PCIe and a different compute node utilizing a different bus protocol may be achieved with a protocol converter that converts communications, such as messages, read requests and write requests, between the PCIe and the different bus protocols.

Figure 1:
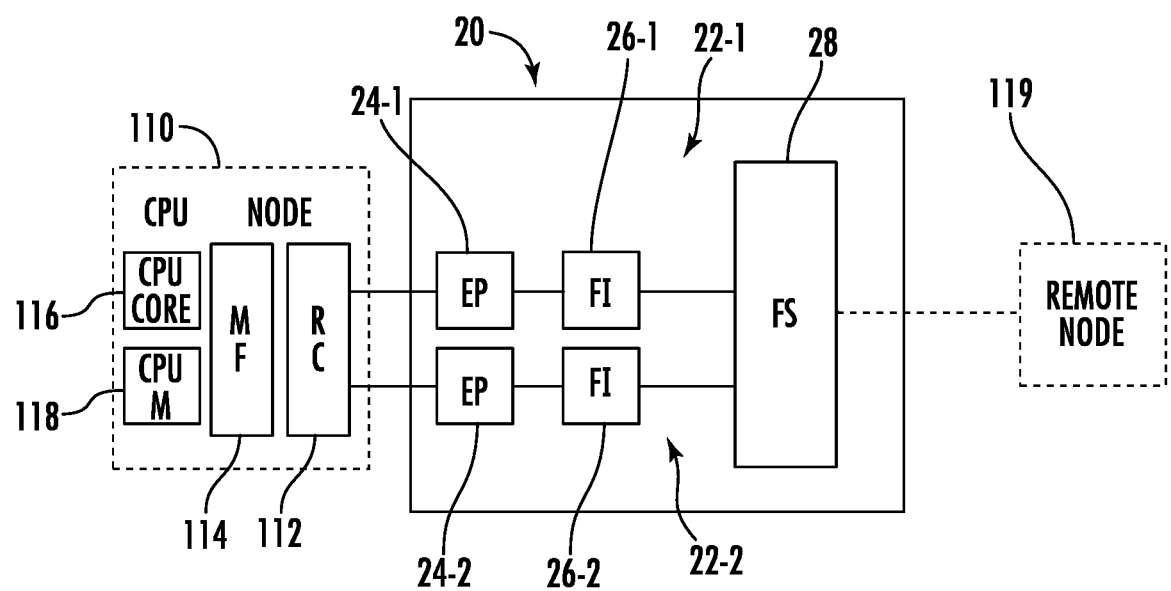
FIG. 1 is a schematic diagram of portions of an example PCIe Protocol Converter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example protocol converters, computing systems and methods that facilitate communication between a compute node operating according to the PCIe protocol and a compute node operating according to a different protocol. Disclosed herein are example protocol converters, computing systems and methods that reduce or prevent data consistency issues in computing systems where different individual writes of a single write request may be concurrently made to a compute node operating under the PCIe protocol across different PCIe links or channels.

Under the PCIe protocol, PCIe writes (packets or other units as part of a larger write request) are posted; they are not acknowledged to the sender. In some bus protocols, a compute node sending such write requests (the sender) may depend upon receiving acknowledgments to determine when to send a flag or completion message that indicates that the last write, of the series of writes forming the larger write request, has been sent. However, in computer systems where the sender is sending the write request to a receiving compute node operating under the PCIe protocol, the sender has no direct way of determining whether all of the writes of the write request have become observable in the receiving compute node. This may result in the sending compute node outputting the flag or completion message prior to all the writes having been made observable in the receiving compute node. This may be especially problematic where different writes of the larger write request are being concurrently transmitted to the receiving compute node across different or independent PCIe links or channels. In such circumstances, the flag or completion message may be transmitted across a first channel and received by the receiving compute node prior to writes of the write request, transmitted across a second channel, having become observable in the memory domain of the receiving compute node.

The disclosed protocol converters, computing systems and methods reduce or prevent such data inconsistencies using a fabric interface of a PCIe Protocol Converter to transmit an acknowledgment to the remote or sending node in response to at least one of the writes becoming observable at the receiving CPU node operating under the PCIe protocol. This acknowledgment is usable by the sending CPU node as a basis for transmitting the flag or write request completion transmission to the receiving CPU node.

In one example implementation, the fabric interface of the PCIe protocol converter outputs a push communication to the receiving compute node operating under the PCIe Protocol following receipt and transmission of at least one write of a write request to the receiving compute node. The push communication causes the receiving CPU node to transmit a push response to the fabric interface in response to a write (the write being transmitted from the fabric interface and preceding the push communication) becoming observable at the receiving CPU node. The fabric interface transmits the acknowledgment in response to receipt of the push response.

In one implementation the push communication comprises a tracking read request and the push response comprises a read completion, corresponding to the tracking read request, wherein the fabric interface transmits the acknowledgment in response to receiving the read completion. In another implementation, the push communication comprises a tracking read request including a forwarding address, wherein the push response comprises a forwarding of the tracking read request to the interface by a root complex of the receiving CPU node in response to a write preceding the tracking read request, received from the fabric interface, becoming observable at the receiving CPU node, wherein the fabric interface transmits the acknowledgment in response to receiving the forwarded tracking read request. In yet another implementation, the push communication comprises a tracking write request including a forwarding address, wherein the push response comprises a forwarding of the tracking write request to the interface by the root complex of the receiving compute node in response to a write received from the fabric interface and preceding the tracking write request becoming observable at the receiving CPU node, wherein the fabric interface transmits the acknowledgment in response to receiving the forwarded tracking write request.

In one implementation, the fabric interface is to output the push communication in response to receipt and transmission of a number of the writes satisfying a numerical plural threshold. In one implementation, the fabric interface dynamically adjusts the numerical plural threshold during the single write request. In one implementation, the numerical plural threshold is based upon at least one factor selected from a group of factors consisting of: a maximum number of posted writes that haven't become visible; a number of outstanding push communications, push communications for which a corresponding push response is not been received; a minimum time for a write to be observable and a minimum time separation from when a write becomes observable in the CPU node and when that visibility/observability has been communicated as a push response to the fabric interface that provided the corresponding push communication. The above factors may facilitate the issuance of the push communications at a higher frequency relative to the writes where there is low write activity while, at the same time, equally spacing the issuance of the push communications as write activity increases. In other implementations, a fewer of such factors, additional factors or other factors may be utilized to dynamically adjust the numerical plural threshold that triggers when a push communication is output following the posting of a write by the fabric interface.

In one implementation, the fabric interface is to determine a number of outstanding push communications, the outstanding push communications being those push communications for which a corresponding push response has not been received. In such an implementation, the fabric interface stops transmitting the first indications in response to the number of outstanding push communications exceeding a predefined threshold.

For purposes of this disclosure, a write request becomes "observable" when the data of the write request may be consistently viewed or seen by external data requesters regardless of where the data may reside within the CPU node. For example, the data of a write request may be "observable" when external requesters for the data receive the same values for the data and the same order of the data from the compute node regardless of whether the data currently resides in one of various caches, elsewhere in the CPU memory fabric or has been written in the actual CPU core itself. The data of the write generally becomes observable when the CPU cache and memory fabric have assumed responsibility for satisfying requests for the data from external requesters.

Posted communications are communications in a protocol for which no acknowledgment is provided following receipt of the communication. Non-posted communications are communications in a protocol, such as PCIe, where an acknowledgment is provided following receipt of a communication. In one implementation, the observability of a write or a group of writes may be determined based upon the ordering of posted communications versus non-posted communications in PCIe. For example, because a non-posted read is ordered with respect to a posted write, receipt of an acknowledgment of a non-posted read may inherently indicate observability of posted writes received prior to receipt of the non-posted read.

Observability of posted writes may likewise be determined based upon the ordering of posted writes with respect to forwarded communications. For example, in peer-to-peer communications, receipt of a forwarded write or a forwarded read from the CPU node by the fabric interface may indicate that prior writes posted to the CPU node by the fabric interface have become observable at the CPU node.

Disclosed herein is an example PCIe (Peripheral Component Interconnect Express) protocol converter for connection to a central processing unit (CPU) node having a root complex, a CPU memory fabric, at least one CPU core and CPU memory. The PCIe Protocol Converter may include independent PCIe links each of which include an endpoint for connection to the root complex and a fabric interface connected to the endpoint. The protocol converter may further include a fabric switch connected to the fabric interface of each of the links and connectable to a remote node. The fabric switch transmits writes of a single write request from the remote node across both links. Each fabric interface is to transmit an acknowledgment to the remote node in response to at least one of the writes becoming observable at the CPU node, the acknowledgment being usable by the remote node as a basis for indicating transmission completion of the single write request.

Disclosed herein is an example computing system. The example computing system may include a central processing unit (CPU) node that comprises a CPU core; a CPU memory; a CPU memory fabric connecting the CPU core and the CPU memory and a CPU root complex connected to the CPU memory fabric. The computing system may further comprise a non-PCIe fabric switch, a first fabric interface connected to the CPU root complex and connected to the non-PCIe fabric switch and a second fabric interface connected to the CPU root complex and connected to the non-PCIe fabric switch. The non-PCIe fabric switch is to transmit writes of a single write request from the remote node across both of the first fabric interface and the second fabric interface. The first fabric interface and the second fabric interface are each to transmit an acknowledgment to the remote node in response to at least one of the writes becoming observable at the CPU node, the acknowledgment being usable by the remote node as a basis for indicating transmission completion of the single write request.

Disclosed herein is an example PCIe write request acknowledgment method which may include receiving, at a first PCIe fabric interface, first writes of a write request transmitted from a remote node across a non-PCIe fabric switch, transmitting, with the first PCIe fabric interface, the first writes to a CPU node, transmitting a first acknowledgment, with the first PCIe fabric interface, to the remote node in response to the writes becoming observable at the CPU node, the acknowledgment being usable by the remote node as a basis for indicating transmission completion of the write request, receiving, at a second PCIe fabric interface, second writes of the write request transmitted from the remote node across the non-PCIe fabric switch, transmitting, with the second PCIe fabric interface, the second writes to a CPU node and transmitting a second acknowledgment, with the second PCIe fabric interface, to the remote node in response to the writes becoming observable at the central processing unit node, the second acknowledgment being usable by the remote node as a basis for indicating transmission completion of the write request.

FIG. 1 is a schematic diagram illustrating portions of an example PCIe protocol converter 20. Protocol converter 20 is for connection to a central processing unit (CPU) node 110 (shown in broken lines) having a root complex 112, a CPU memory fabric 114, at least one CPU core 116 and CPU memory 118. The PCIe protocol converter 20 comprises independent PCIe channels or links 22-1, 22-2 (collectively referred to as links 22). Although converter 20 is illustrated as comprising two independent PCIe links, converter 20 may comprise greater than two links. For example, in one implementation, converter 20 may comprise four independent PCIe links.

Each of links 22 comprises an endpoint and a fabric interface. In the example illustrated, link 22-1 comprises endpoint 24-1 and fabric interface 26-1. Likewise, link 22-2 comprises endpoint 24-2 and fabric interface 26-2. The protocol converter further comprises a fabric switch 28 that is connected to the fabric interfaces 26-1, 26-2 (collectively referred to as fabric interfaces 26) and is further connectable to a remote node 119 (shown in broken lines), such as a CPU node that is operating according to a non-PCIe protocol. The fabric switch 28 is to transmit writes of a single write request from the remote node 119 across or using both of links 22. Although remote node 119 is illustrated as being directly connected to fabric interfaces 26-1, 26-2, in other implementations, remote node 119 may be indirectly connected to fabric interfaces 26 through other intermediary fabric switches.

Each fabric interface 26 is to transmit an acknowledgment to the remote node 119 in response to at least one of the writes becoming observable at the CPU node 110. The remote node 119 is to use the acknowledgment, alone or in combination with other received acknowledgments for the write request, as a basis for indicating transmission completion of the single write request. Because the acknowledgments received by the remote node 119 indicates that the corresponding writes have become observable at CPU node 110, the flag or the indication of transmission completion of the write request cannot be transmitted before an entirety of the write request has become observable at CPU node 110. As a result, data inconsistencies, caused by a flag or transmission completion being output and received by CPU node prior to all of the previously sent writes having become observable, are reduced or prevented.

Figure 2:
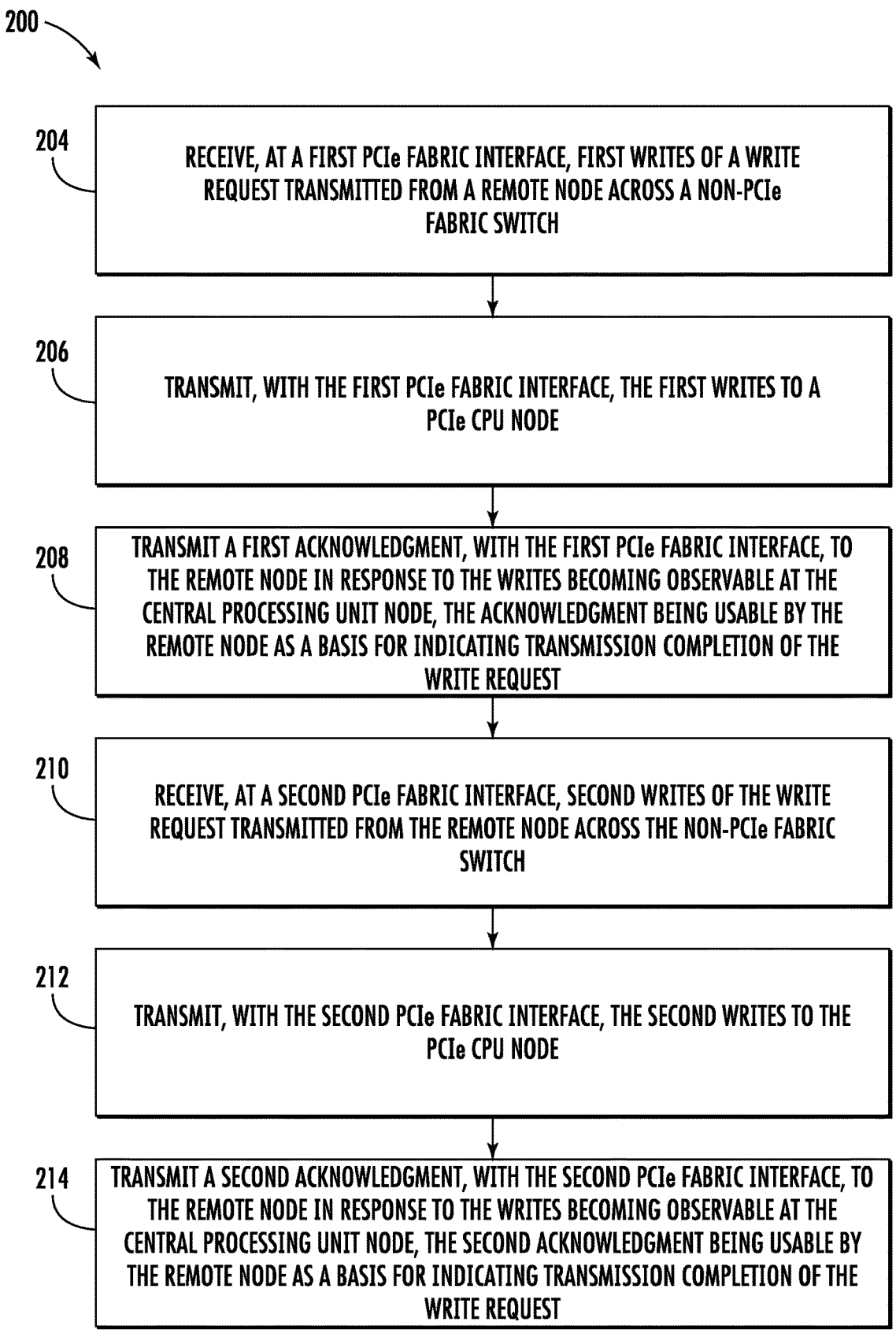
FIG. 2 is a flow diagram of an example PCIe write request acknowledgment method.

FIG. 2 is a flow diagram of an example PCIe write request acknowledgment method 200. Method 200 reduces or prevents data inconsistencies using a fabric interface of a PCIe Protocol Converter to transmit an acknowledgment to the remote or sending node in response to at least one of the writes becoming observable at the receiving CPU node operating under the PCIe protocol. Although method 200 is described in the context of being carried out using protocol converter 20 described above, it should be appreciated that method 200 may likewise be utilized with any of the protocol converters or computing system described hereafter or with other similar protocol converters or computing systems.

As indicated by block 204, a first PCIe fabric interface receives first writes of a write request transmitted from a remote node across a non-PCIe fabric switch. As indicated by block 206, the first PCIe fabric interface transmits the first writes to a PCIe CPU node.

As indicated by block 208, the first PCIe fabric interface transmits a first acknowledgment to the remote node in response to the writes becoming observable at the PCIe CPU node. The acknowledgment is usable by the remote node as a basis for indicating transmission completion of the write request.

As indicated by block 210, a second PCIe fabric interface receives second writes of the write request transmitted from the remote node across the non-PCIe fabric switch. As indicated by block 212, the second PCIe fabric interface transmits the second writes to the PCIe CPU node.

As indicated by block 214, the second PCIe fabric interface transmits a second acknowledgment to the remote node in response to the writes becoming observable at the PCIe CPU node. The second acknowledgment is usable by the remote node as a basis for indicating transmission completion of the write request.

Figure 3:
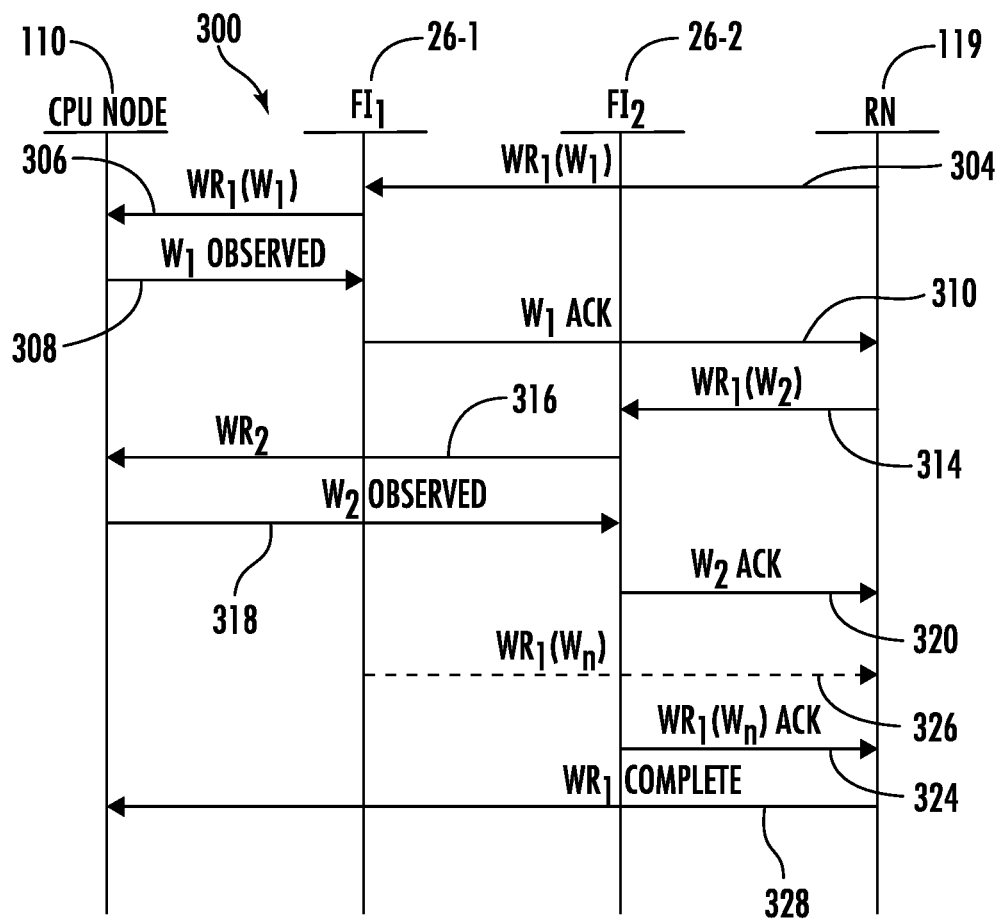
FIG. 3 is a process flow diagram of an example PCIe write request transmission.

FIG. 3 is a process flow diagram of an example write request transmission 300 from a remote CPU node, such as CPU node 119, operating in a non-PCIe protocol environment to a CPU node, such as CPU node 110, operating in a PCIe protocol environment (a "PCIe CPU node"). In the example transmission showing FIG. 3, the write request (WR) comprises a series of individual packets or writes $W_1$, $W_2$, $W_3$ ... $W_n$. The write requests are transmitted across different PCIe channels or links and across different fabric interfaces to the PCIe CPU node 110.

As indicated by arrow 304, write $W_1$ of the write request is transmitted from the remote node 119 to the fabric interface 26-1 across a first PCIe link. As indicated by arrow 306, upon receiving write $W_1$, fabric interface 26-1 transmits the write $W_1$ to the PCIe CPU node 110. Should be appreciated, such a position may involve memory mapping which translate between different addressing schemes or protocols. As indicated by arrow 308, once the write $W_1$ has been observed by the PCIe CPU node, the PCIe CPU node 110 transmits an observability indication to the fabric interface 26-1. As indicated by block 310, in response to receiving the indication from the PCIe CPU node 110, the fabric interface 26-1 transmits a write acknowledgment ($W_1$ ACK) to the remote node 119.

As indicated by arrow 314, write $W_2$ of the write requests is transmitted from the remote node 119 to the fabric interface 26-2 across a second PCIe link, independent of the first PCIe link. As indicated by arrow 316, upon receiving write $W_2$, fabric interface 26-2 transmits the write $W_2$ to the PCIe CPU node 110. As indicated by arrow 318, once the write $W_2$ has been observed by the PCIe CPU node, the PCIe CPU node 110 transmits an observability indication to the fabric interface 26-2. As indicated by block 320, in response to receiving the indication from the PCIe CPU node 110, the fabric interface 26-2 transmits a write acknowledgment ($W_2$ ACK) to the remote node 119.

As indicated by arrows 324 or 326 (shown in broken lines), the process flows identified by arrows 304-320 continue until the final write $W_n$ of the write request has been transmitted from remote node 119 to PCIe CPU node 110 across fabric interface 26-1 or 26-2 and the remote node 119 has received a write acknowledgment $W_n$ ACK for the write $W_n$. As indicated by arrow 328, upon receiving the write acknowledgment $W_n$ ACK for the write $W_n$, the remote node 119 transmits a write request complete signal or flag to the PCIe CPU node 110 across either of the links and the respective fabric interfaces 26-1, 26-2. Because the transmission of the write request complete signal or flag is transmitted in response to the write acknowledgment $W_n$ ACK which is itself transmitted in response to the final write $W_n$ being observable at the PCIe CPU node 110, receipt of the write acknowledgment $W_n$ means that all of the writes, regardless of which link such writes were sent, have become observable at PCIe CPU node 110.

Although the example process flow 300 illustrates the write observance signal for write $W_1$ indicated by arrow 308 as immediately succeeding receipt of the write $W_1$ as indicated by block 306, in other circumstances, the write observance signal for write $W_1$ may succeed the receipt of other writes of the write request from either fabric interface 26-1 and/or fabric interface 26-2. For example, the receipt of the write $W_2$ from fabric 26-2 may be received by CPU node 110 before the transmission of the observance signal for write $W_1$. In some implementations, the output of the observance signal for write $W_2$ may precede the output of the observance signal for write $W_1$ despite the write $W_2$ being sent by remote node 119 along a different PCIe link prior to the time in which $W_1$ is sent by remote node 119.

Figure 4:
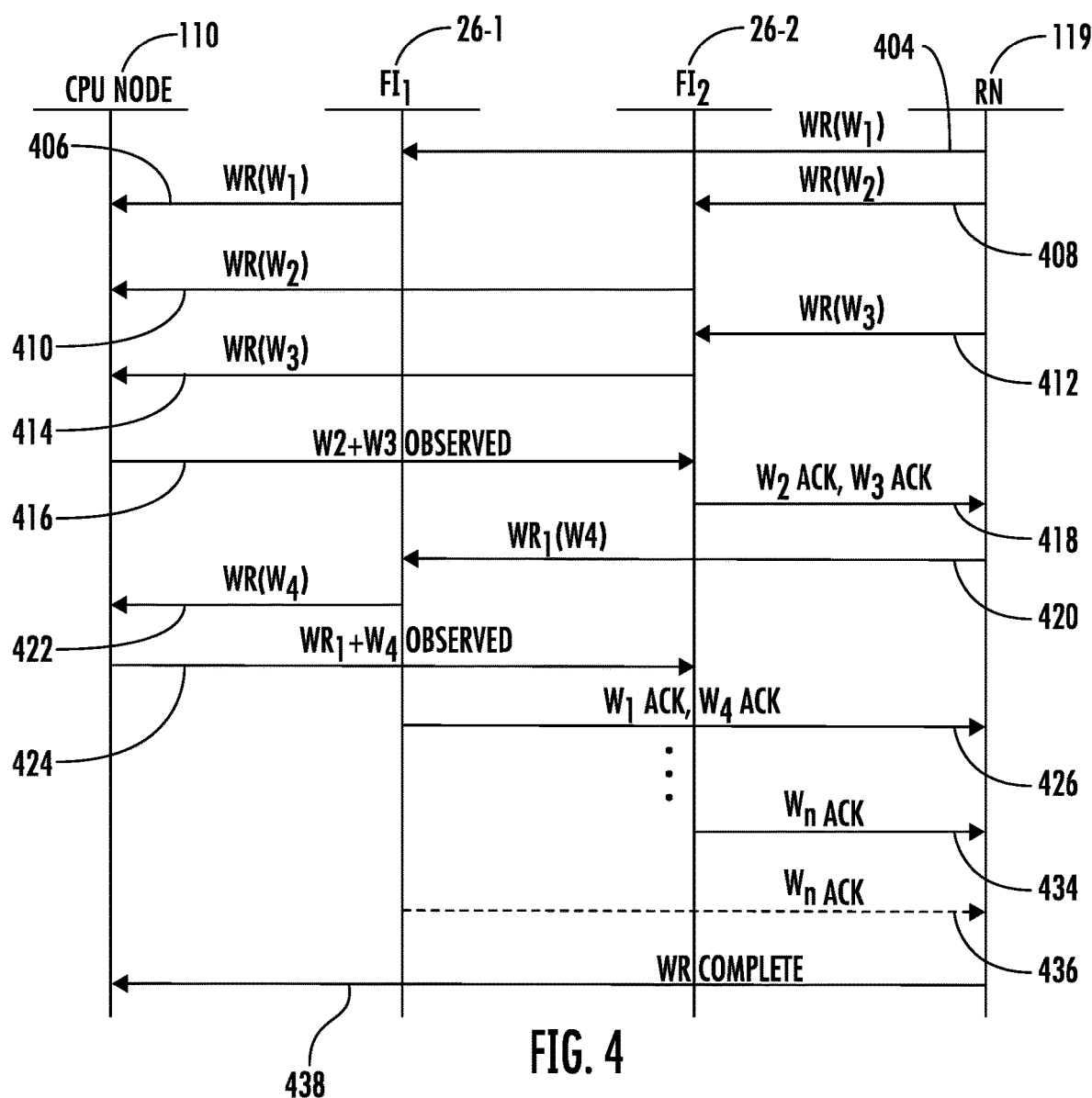
FIG. 4 is a process flow diagram of an example PCIe write request transmission.

FIG. 4 is a process flow diagram of an example write request transmission 400 from a remote CPU node, such as CPU node 119, operating in a non-PCIe protocol environment to a CPU node, such as CPU node 110, operating in a PCIe protocol environment (a "PCIe CPU node"). The example write request transmission 400 is similar to the example write request transmission 300 described above except that an observance signal is output by the PCIe CPU node 110 in response to a set of multiple writes having become observable at the PCIe CPU node 110. In one implementation, the observance signal is transmitted after a predefined number of consecutive writes received by a link across a fabric interface have become observable at the PCIe CPU node. In one implementation, this predefined number may be dynamically varied. In the example illustrated, the observance signal is output after two consecutive writes received from a link and a fabric interface have become observable at the PCIe CPU node 110. In other implementations, the observance signal may be output in response to other predefined consecutive numbers of writes W received across a single link having become observable at the PCIe CPU node 110.

In the example transmission shown in FIG. 4, the write request (WR) comprises a series of individual packets or writes $W_1, W_2, W_3 \ldots W_n$, $W_n$ being the last write of the write request WR. The write requests are transmitted across different PCIe channels or links and across different fabric interfaces to the PCIe CPU node 110. As indicated by arrow 404, write $W_1$ of the write request is transmitted from the remote node 119 to the fabric interface 26-1 across a first PCIe link. As indicated by arrow 406, upon receiving write $W_1$, fabric interface 26-1 transmits the write $W_1$ to the PCIe CPU node 110. As indicated by arrow 408, write $W_2$ of the write request is transmitted from the remote node 119 to the fabric interface 26-2 across a second PCIe link. As indicated by arrow 410, upon receiving write $W_2$, fabric interface 26-2 transmits the write $W_2$ to the PCIe CPU node 110. As indicated by arrow 412, write $W_3$ of the write request is transmitted from the remote node 119 to the fabric interface 26-2 across the second PCIe link. As indicated by arrow 414, upon receiving write $W_3$, fabric interface 26-2 transmits the write $W_3$ to the PCIe CPU node 110. As indicated by arrow 416, upon writes $W_2$ and $W_3$ having both become observable at PCIe CPU node 110, node 110 transmits an observance signal communication to fabric interface 26-2, the fabric interface from which writes $W_2$ and $W_3$ were transmitted. As indicated by arrow 418, in response to receiving the observance signal, fabric interface 26-2 transmits acknowledgments for each of writes $W_2$ and $W_3$ to remote node 119. These acknowledgments are utilized by remote node 119 as a basis for determining when to output a write request completion or flag to the PCIe CPU node 110.

As indicated by arrow 420, remote node 119 continues to transmit writes of the write request. Remote node 119 transmits write $W_4$ of the write request to fabric interface 26-1, where fabric interface 26-1 then transmits the write $W_4$ to PCIe CPU node 110 as indicated by arrow 422. As indicated by arrow 424, upon writes $W_1$ and $W_4$ becoming observable at PCIe CPU node 110, node 110 transmits an observance signal communication to fabric interface 26-1, the fabric interface from which writes $W_1$ and $W_4$ were transmitted. As indicated by arrow 426, in response to receiving the observance signal, fabric interface 26-1 transmits acknowledgments for each of writes $W_2$ and $W_3$ to remote node 119. These acknowledgments are utilized by remote node 119 as a basis for determining when to output a write request completion or flag to the PCIe CPU node 110.

As indicated by arrows 434 or 436 (shown in broken lines), the process flows identified by arrows 404-426 continue until the final write $W_n$ of the write request has been transmitted from remote node 119 to PCIe CPU node 110 across fabric interface 26-1 or 26-2 and the remote node 119 has received a write acknowledgment $W_n$ ACK for the write $W_n$. As indicated by arrow 438, upon receiving the write acknowledgment $W_n$ ACK for the write $W_n$, the remote node 119 transmits a write request complete signal or flag to the PCIe CPU node 110 across either of the links and the respective fabric interfaces 26-1, 26-2. Because the transmission of the write request complete signal or flag is transmitted in response to the write acknowledgment $W_n$ ACK which is itself transmitted in response to the final write $W_n$ being observable at the PCIe CPU node 110, receipt of the write acknowledgment $W_n$ means that all of the writes, regardless of which link such writes were sent, have become observable at PCIe CPU node 110.

Figure 5:
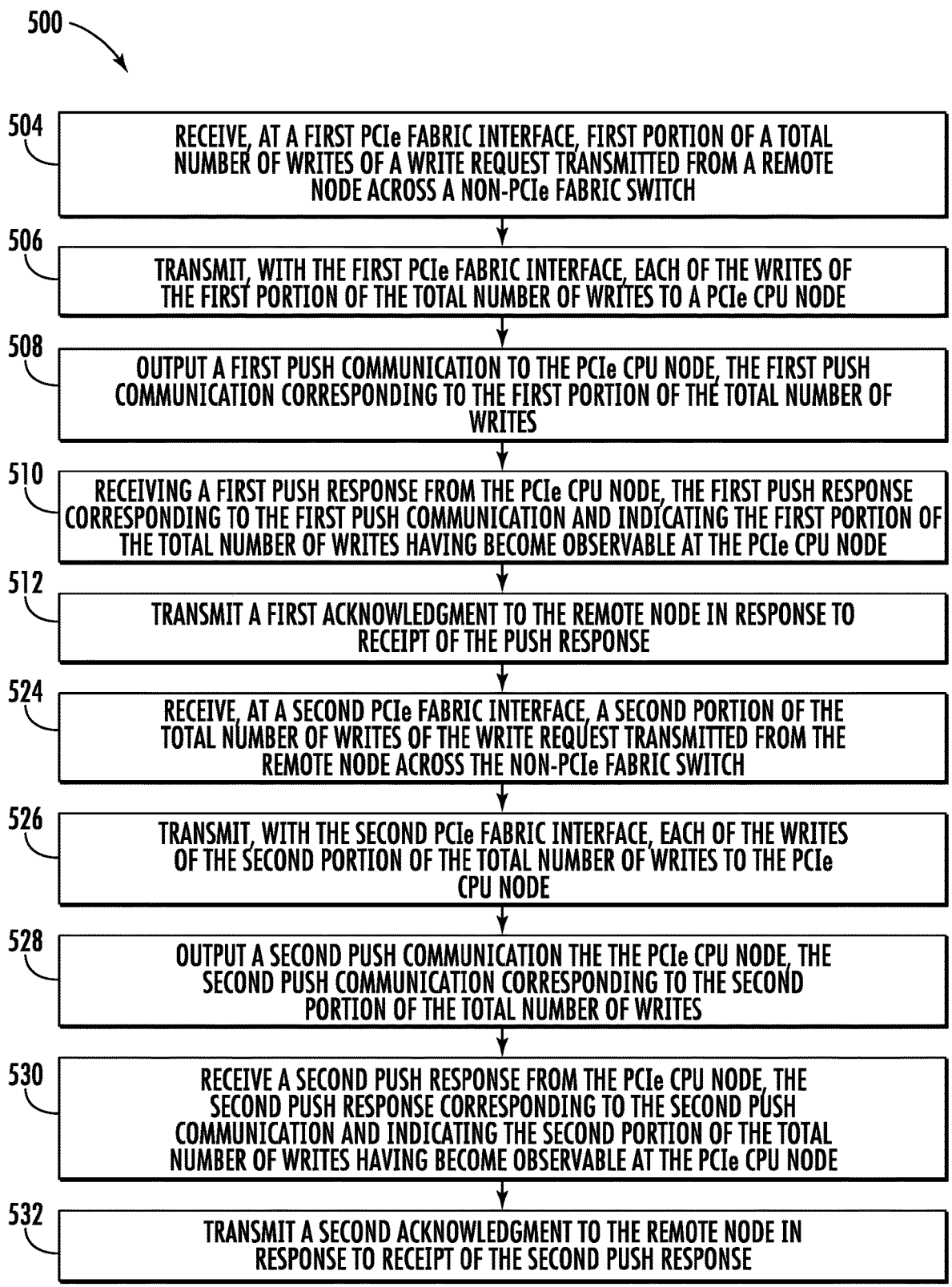
FIG. 5 is a flow diagram of an example PCIe write request acknowledgment method.

FIG. 5 is a flow diagram of an example PCIe write request acknowledgment method 500. Method 500 reduces or prevents data inconsistencies using a fabric interface of a PCIe Protocol Converter to transmit an acknowledgment to the remote or sending node in response to at least one of the writes becoming observable at the receiving CPU node operating under the PCIe protocol. Although method 500 is described in the context of being carried out using protocol converter 20 described above, it should be appreciated that method 500 may likewise be utilized with any of the protocol converters or computing system described hereafter or with other similar protocol converters or computing systems.

As indicated by block 504, a first PCIe fabric interface receives a first portion (sometimes referred to as an "epoch") of a total number of writes of a write request transmitted from a remote node across a non-PCIe fabric switch. As indicated by block 506, the first PCIe fabric interface transmits each of the writes of the first portion to a PCIe CPU node. As indicated by block 508, following transmission of the first portion of the total number of writes of the write request to the PCIe CPU node, the first PCIe fabric interface outputs a push communication to the PCIe CPU node. As indicated by block 510, the push communication causes the PCIe CPU node to transmit a push response to the fabric interface in response to each of the writes of the first portion becoming observable at the PCIe CPU node. This push response is received by the first PCIe fabric interface. As indicated by block 512, the first PCIe fabric interface transmits an acknowledgment for each of the writes of the first portion in response to receipt of the first push response.

As indicated by block 524, a second PCIe fabric interface receives a second portion of a total number of writes of the write request transmitted from a remote node across a non-PCIe fabric switch. The individual writes of the second portion may be intermixed with writes of the first portion. For example, the first portion may comprise writes $W_1$, $W_2$, $W_4$, $W_7$ and so on while the second portion may comprise writes $W_3$, $W_5$, $W_6$, $W_8$ and so on in the series of writes $W_1$-$W_n$ forming the overall write request.

As indicated by block 526, the second PCIe fabric interface transmits each of the writes of the second portion to a PCIe CPU node. As indicated by block 528, following transmission of the second portion of the total number of writes of the write request to the PCIe CPU node, the second PCIe fabric interface outputs a second push communication to the PCIe CPU node. As indicated by block 530, the second push communication causes the PCIe CPU node to transmit a second corresponding push response to the fabric interface in response to each of the writes of the second portion having become observable at the PCIe CPU node.

This second push response is received by the second PCIe fabric interface. As indicated by block 532, the second fabric interface transmits an acknowledgment for each of the writes of the second portion in response to receipt of the second push response. The push communications trigger a responsive communication from the PCIe CPU node when the first portion of writes preceding the push communication have become observable at the PCIe CPU node. Likewise, the second push communication triggers a responsive communication from the PCIe CPU node when the second portion of writes preceding the second push communication have become observable at the PCIe CPU node.

In one implementation, the respective push communications each comprises a tracking read request while the respective push responses each comprise a read completion, corresponding to the tracking read request, wherein the fabric interfaces transmit the acknowledgment in response to receiving the read completion. In one implementation, the tracking read request may be a request to read any address and not necessarily the address of a prior posted write for which the tracking read request is part of the process for determining observability of the prior posted write. In another implementation, the respective push communications each comprise a tracking read request including a forwarding address, wherein the respective push responses each comprise a forwarding of the tracking read request to the first interface and the second interface, respectively, by a root complex of the receiving PCIe CPU node in response to a write preceding the tracking read request, received from the fabric interface, becoming observable at the receiving CPU node, wherein the fabric interface transmits the acknowledgment in response to receiving the forwarded tracking read request. In yet another implementation, the respective push communications each comprise a tracking write request including a forwarding address, wherein the respective push responses each comprise a forwarding of the tracking write request to the first fabric interface and the second fabric interface, respectively, by the root complex of the receiving PCIe compute node in response to a write received from the fabric interface and preceding the tracking write request becoming observable at the receiving PCIe CPU node, wherein the first fabric interface and the second fabric interface each transmit the acknowledgment in response to receiving the forwarded tracking write request.

In one implementation, each of the first fabric interface and the second fabric interface is to output the push communication in response to receipt and transmission of a number of the writes satisfying a numerical plural threshold (sometimes referred to as an "epoch"). In one implementation, each of the first and second fabric interfaces dynamically adjusts the numerical plural threshold during the single write request. In one implementation, the numerical plural threshold is based upon at least one factor selected from a group of factors consisting of: a maximum number of posted writes that haven't become visible; a number of outstanding push communications, push communications for which a corresponding push response is not been received; a minimum time for a write to be observable and a minimum time separation from when a write becomes observable in the CPU node and when that visibility/observability as been communicated as a push response to the fabric interface that provided the corresponding push communication. The above factors may facilitate the issuance of the push communications at a higher frequency relative to the writes where there is low write activity while, at the same time, equally spacing the issuance of the push communications as write activity increases. In other implementations, a fewer of such factors, additional factors or other factors may be utilized to dynamically adjust the numerical plural threshold that triggers when a push communication is output following the posting of a write by the fabric interface.

In one implementation, the first and second fabric interfaces each determine a number of outstanding respective push communications, the outstanding push communications being those push communications for which a corresponding push response has not been received. In such an implementation, the first fabric interface stops transmitting the push communications in response to the number of its outstanding push communications exceeding a predefined threshold. Likewise, the second fabric interface stops transmitting push communications in response to its number of outstanding push communications exceeding a predefined threshold.

Figure 6:
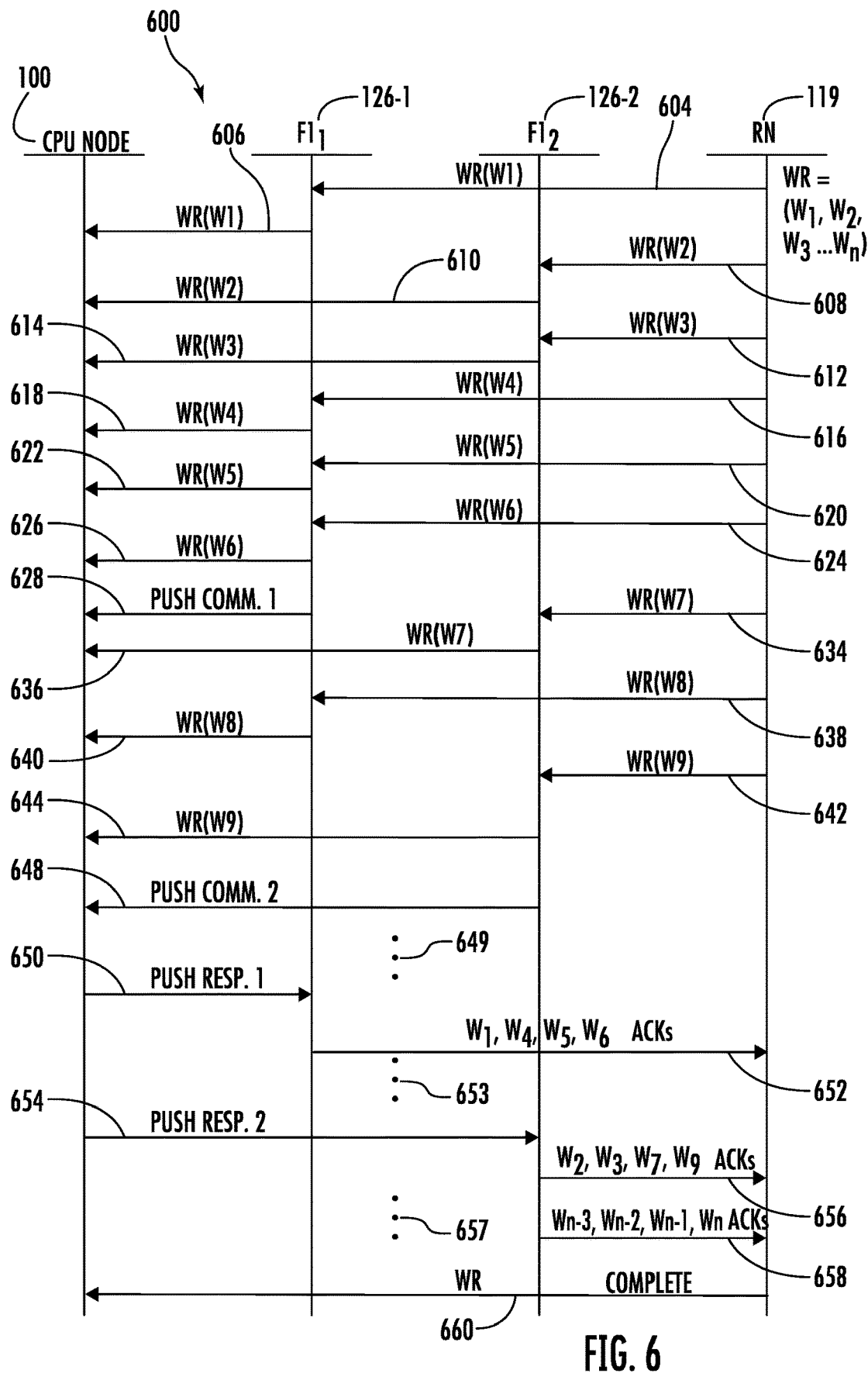
FIG. 6 is a process flow diagram of an example PCIe write request transmission.

FIG. 6 is a process flow diagram of an example write request transmission 600 from a remote CPU node, such as CPU node 119, operating in a non-PCIe protocol environment to a CPU node, such as CPU node 110, operating in a PCIe protocol environment (a "PCIe CPU node"). The example write request transmission 600 is carried out in accordance with method 500 described above with respect to FIG. 5. In the example illustrated, the fabric interfaces 126-1, 126-2 output their respective push after transmitting a portion consisting of four writes of the total series of writes of the write request. In other implementations, the fabric interfaces 126-1, 126-2 may their respective push communications, respectively, after transmitting a portion consisting of a different number of writes of the total series of writes of the write request. In some implementations, the frequency at which the respective push communications are output, or the ratio of the respective push communications to transmitted writes may be dynamically varied during receipt of a write request based upon various ongoing or present factors such as a maximum number of writes that haven't become visible; a number of outstanding push communications, push communications for which a corresponding push response is not been received; a minimum time for a write to be observable and a minimum time separation from when a write becomes observable in the CPU node and when that visibility/observability has been communicated as a push response to the fabric interface that provided the corresponding push communication. The above factors may facilitate the issuance of the push communications at a higher frequency relative to the writes where there is low write activity while, at the same time, equally spacing the issuance of the push communications or equally spacing the issuance of the push communications as write activity increases.

In the example illustrated in FIG. 6, as indicated by arrow 604, the remote node 119 begins transmitting a write request consisting of writes $W_1$-$W_n$ by transmitting write $W_1$ across a first PCIe Link to fabric interface 126-1. As indicated by arrow 606, the fabric interface 126-1 responds by transmitting the write $W_1$ to PCIe CPU node 110.

As indicated by arrow 608, remote node 119 follows by transmitting the second write, write $W_2$, of the series of writes forming the write request across a second PCIe Link to fabric interface 126-2. As indicated by arrow 610, the fabric interface 126-2 responds by transmitting the writes W2 to PCIe CPU node 110. As indicated by arrow 612, remote node 119 follows by transmitting the third write, write $W_3$, of the series of writes forming the write request across the second PCIe Link to fabric interface 126-2. As indicated by arrow 614, the fabric interface 126-2 responds by transmitting the write $W_3$ to PCIe CPU node 110. As indicated by arrow 616, remote node 119 continues by transmitting write $W_4$ across the first PCIe Link to fabric interface 126-1. As indicated by arrow 618, the fabric interface 126-1 responds by transmitting the write $W_4$ to PCIe CPU node 110. As indicated by arrow 620, remote node 119 continues by transmitting write $W_5$ across the first PCIe Link to fabric interface 126-1. As indicated by arrow 622, the fabric interface 126-1 responds by transmitting the write $W_5$ to PCIe CPU node 110. As indicated by arrow 624, remote node 119 continues by transmitting write W6 across the first PCIe Link to fabric interface 126-1. As indicated by arrow 626, the fabric interface 126-1 responds by transmitting the write $W_6$ to PCIe CPU node 110.

At such point in time, fabric interface 126-1, which has been tracking the number of writes that have been transmitted to the PCIe CPU node 110 since the last push communication during the transmission of a write request, determines that four such writes $W_1$, $W_4$, $W_5$ and $W_6$ have been transmitted by fabric interface 126-1. In the example being described, the transmission of four writes, the first portion of the series of writes forming the write request, causes the fabric interface 126-1 to output the push communication to CPU node 110 as indicated by arrow 628. As described above with respect to method 500, this "push communication" triggers a responsive communication from the PCIe CPU node 110 when the first portion of writes transmitted from fabric interface 126-1 and preceding the push communication (writes $W_1$, $W_4$, $W_5$ and $W_6$) have become observable at the PCIe CPU node 110.

As indicated by arrow 634, remote node 119 continues with the transmission of the write request by transmitting write $W_7$ across the second PCIe link to fabric interface 126-2. Fabric interface 126-2 transmits the write $W_7$ to PCIe CPU node 110 as indicated by arrow 636. As indicated by arrow 638, remote node 119 continues by transmitting write $W_8$ across the first PCIe link to fabric interface 126-1. Fabric interface 126-1 transmits the write $W_8$ to CPU node 110 as indicated by arrow 640. As indicated by arrow 642, remote node 119 transmits write $W_9$ across the second PCIe link to fabric interface 126-2 which transmits write $W_9$ to CPU node 110 as indicated by arrow 644.

At such point in time, fabric interface 126-2, which has been tracking the number of writes that it has transmitted to the PCIe CPU node 110 since the last push communication during the transmission of a write request, determines that 4 such writes, $W_2$, $W_3$, $W_7$ and $W_8$, have been transmitted by fabric interface 126-2. In the example being described, the transmission of four writes, the second portion of the series of writes forming the write request, causes the fabric interface 126-2 to output the second push communication to CPU node 110 as indicated by arrow 648. As described above with respect to method 500, this "third communication" triggers a responsive communication from the PCIe CPU node 110 when the second portion of writes transmitted from fabric interface 126-2 and preceding the push response (writes W-2, W3, W7 and W8) have become observable at the PCIe CPU node 110.

As indicated by the ellipsoids 649, the transmission of writes of the write request to the different fabric interfaces 126-1, 126-2 in the transmission of forwarding of such writes by such fabric interfaces 126-1:26-2 to PCIe CPU node 110 continues as described above. As indicated by block 650, in response to each of the writes of the first portion of writes received from fabric interface 126-1 having become observable by CPU node 110, CPU node 110 outputs the push response 1 (corresponding to the push communication 1) to fabric interface 126-1. As indicated by arrow 652, upon receiving the push response 1, fabric interface 26-1 outputs or transmits acknowledgments for each of the writes of the first portion, writes $W_1$, $W_4$, $W_5$ and $W_6$, to remote node 119.

As indicated by arrow 654, possibly after further transmission of additional writes by remote node 119 through fabric interfaces 126-1 and/or fabric interface 126-2 (as indicated by ellipsoids 653), the second portion of the writes may have become observable by the PCIe CPU node 110. In response to the second portion of writes, writes $W_2$, $W_3$, $W_7$ and $W_9$, the PCIe CPU node 110 outputs the push response 2 (corresponding to the push communication 2) to fabric interface 126-2. As indicated by arrow 656, upon receiving the push response 2, fabric interface 26-1 outputs or transmits acknowledgments for each of the writes of the second portion, writes $W_2$, $W_3$, $W_7$ and $W_9$, to remote node 119.

As indicated by ellipsoids 657, this overall process continues until remote node 119 has received an acknowledgment from either of fabric interfaces 126-1, 126-2 for the final write $W_n$ of the write request. In the example illustrated, as indicated by arrow 658, fabric interface 126-2 has sent the acknowledgments for writes $W_{n-3}$, $W_{n-2}$, $W_{n-1}$ and $W_n$. In other examples, fabric interface 126-1 may send the acknowledgments for the final writes of the write request. The acknowledgments are sent in batches of four due to the "push communication" being output following every four writes being transmitted. As indicated by block 660, upon receiving the acknowledgment for the final write $W_n$ of the write request, remote node 119 outputs a write request complete signal or flag to the PCIe CPU node 110 through either of the first PCIe link and fabric interface 126-1 or the second PCIe link and fabric interface 126-2.

Figure 7:
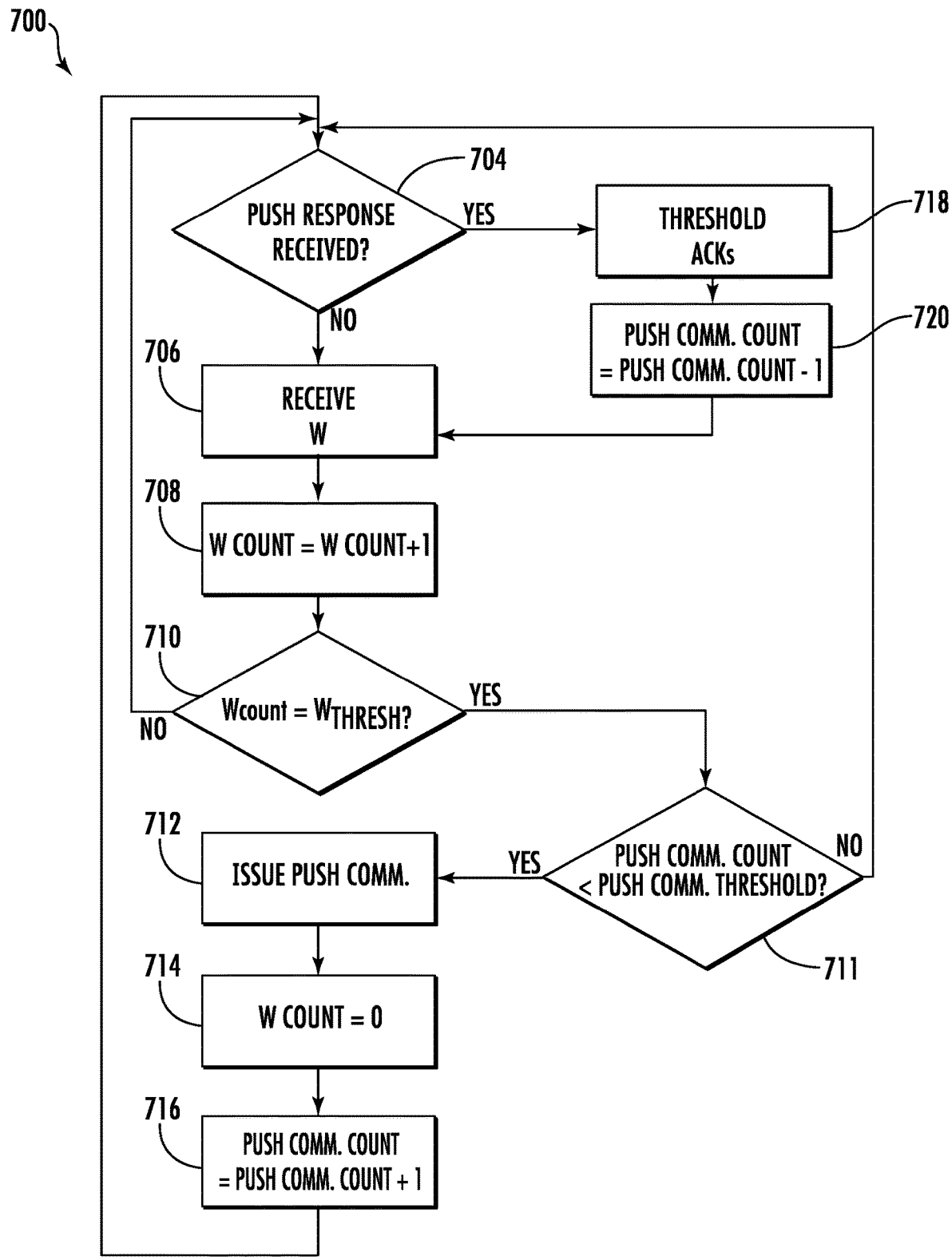
FIG. 7 is a flow diagram of an example method for limiting the number of outstanding push communications.

FIG. 7 is a flow diagram of an example method 700 that may be carried out by each of fabric interfaces 126-1, 126-2 for limiting the number of outstanding "push communications" to limit the consumption of transmission bandwidth for the purposes of tracking when transmitted writes have become observable at the recipient PCIe CPU node. Method 700 is described in the context of being carried out by fabric interface 126-1 described above. Method 700 may likewise be carried out by fabric interface 126-2 or other fabric interfaces of a particular PCIe protocol converter.

As indicated by block 704, a determination is made by the processing unit of fabric interface 126-1 as to whether the "push response" (described above with respect to methods 500 and 600) has been received. If the push response has not been received, fabric interface 126-1 awaits receipt of the next write W as indicated by block 706. As indicated by block 708, upon receipt of a write, a counter, provided as part of interface 126-1, increments its write count by one. As indicated by block 710, the processing unit of the fabric interface 126-1 compares the current write count to a write threshold.

As indicated by decision block 711, the processor of fabric interface 126-1 compares the current number of outstanding "push communications" to outstanding communication threshold. The outstanding communication threshold is a predetermined value that limits the number of outstanding, pending or active "push communications" that may be awaiting a corresponding "push response" to reduce overconsumption of transmission bandwidth. As indicated by block 712, in response to the write count satisfying the write threshold, and the number of outstanding push communications being less than the push communication threshold, the processing unit of the fabric interface issues the "push communication". As indicated by blocks 714 and 716, following the issuance of the "push communication", the processing unit of the fabric interface 126-1 resets the write count to a start value, such as zero, and increments the "push communication" count by one. Thereafter, the process continues back to decision block 704.

As indicated by arrow 711, in response to the number of outstanding push communications equaling the outstanding communication threshold, method 700 proceeds to decision block 704, not issuing another push communication.

As indicated by block 718, in response to the "push response" having been received from the PCIe CPU node 110, the processing unit of the fabric interface 126-1 transmits the acknowledgments for each of the writes preceding the push communication that corresponds to this received push response. As indicated by block 720, in response to receiving the push response per block 704, the processing unit of the fabric interface further decremenets the push communication count by one prior to awaiting receipt of the next write pursuant to block 706.

Figure 8:
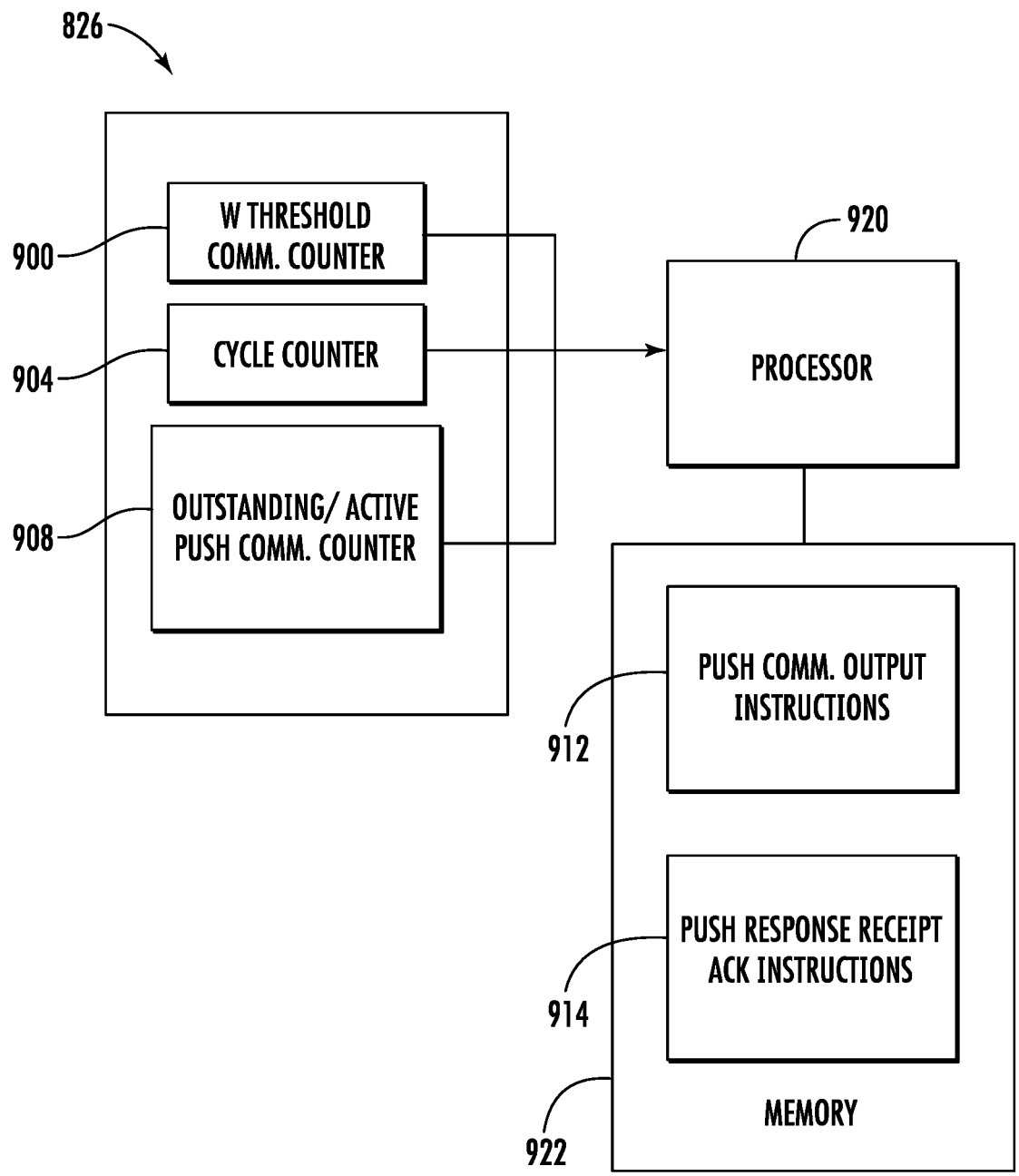
FIG. 8 is a block diagram schematically illustrating portions of an example fabric interface that may be used as part of a protocol converter.

FIG. 8 is a block diagram of portions of an example fabric interface 826 that may serve as any of fabric interfaces 26 of protocol converter 20 described above with respect to FIG. 1 for carrying out any of the above-described methods or process flows. Fabric interface 826 comprises write threshold communication counter 900, cycle counter 904, outstanding/active push communication counter 908, push communication output instructions 912, push response receipt and acknowledgment instructions 914 and processor 920. Write threshold communication counter tracks the number of writes that have been issued by fabric interface 826 since the last push communication or pushing request was issued by interface 826.

Cycle counter 904 counts the number of clock cycles since the first write issued after the last push communication was issued by interface 826. The outstanding/active push communication counter 908 counts the number of active pushing communications (and corresponding pushing operations), the pushing communications for which a push response has not yet been received.

Push communication output instructions and push response receipt and acknowledgment instructions comprise programming, code or logic provided in a non-transitory computer-readable media or memory 922. Push communication output instructions 912 comprises such a module that controls the timing and frequency at which push communications are issued by interface 826. In one implementation, instructions 912 direct processor 920 to output push communications when:

((request_counter>0) & (cycle_counter>L) & ((request_counter>>B)>=pushers_active)), where N—the maximum number of posted writes that haven't reached global visibility that can be pending past interface 826. In one implementation, 128 256B writes can be pending on PCIe, plus 16 256B requests in the IOMMU, and 80-90 cacheline sized requests in IOM, plus additional buffering. This may be on the order of 164 256B requests or 224 64 writes.

T—The number of tracked pushing communications. In one implementation, this number is in the order of 16 if reads are used, and possibly higher for write pushing communications.

B—Equals INT (log 2(N/T)), thus for N=256 and T=16, B=4. Expected "end-of-spectrum" values would be memory fabric with N=128 posted requests using 32 posted write pushes yields B=2. A large memory fabric having N=512 with only T=8 pushing reads yields B=6.

L—The low threshold. This is CSR controlled and represents the minimum time at which issuing a push communication would do any good. For instance, if the memory fabric has a minimum separation of 7 cycles between completing a write and releasing a subsequent non-posted push communication, then issuing a non-posted push communication in 6 or fewer cycles would offer limited benefit.

The above algorithm or method for issuing push communications results in push communications being issued or output at a greater frequency relative to the number of writes in circumstances where there is a low write activity, but, at the same time, facilitates equally spaced push communications as write activity increases.

As discussed above, in some implementations, the push communications may comprise peer-to-peer communications wherein the push communication comprises a push write request to be forwarded back to interface 826. In such implementations, the number of such push communications that may be utilized may be increased since the number of peer to peer push write requests may not directly reduce the number of upstream requests such as reads. It should be appreciated, however, that in some implementations, the number of push writes that may be used for pushing communications may be limited in number due to the limited size of the counter, such as a FIFO counter, that tracks those non-push communication writes that correspond to each push write communication.

Push response receipt and acknowledgment instructions 914 comprise programming, code or logic provided in a non-transitory computer-readable media or memory 922. Push communication output instructions 912 comprises such a module that controls the outputting of acknowledgments to the remote node 119 in response to receiving the push responses. In one implementation, instructions 912 direct processor 920 to output and acknowledgment for each of the writes that correspond to a previously issued push communication in response to receipt of the push response corresponding to the push communication.

Note that since non-posted requests can pass each other, and since completions can pass each other, it is possible for write pushing read completions to be returned out of order. Thus, the completion tracking logic handles such an occurrence. If the tracking logic only noticed that a pushing operation completed it would fine to just release the Acks of the next in line Epoch. In one it implementation, the interface 826 lines up the completion with its epoch number and releases all acks for all epochs in between.

Figure 9:
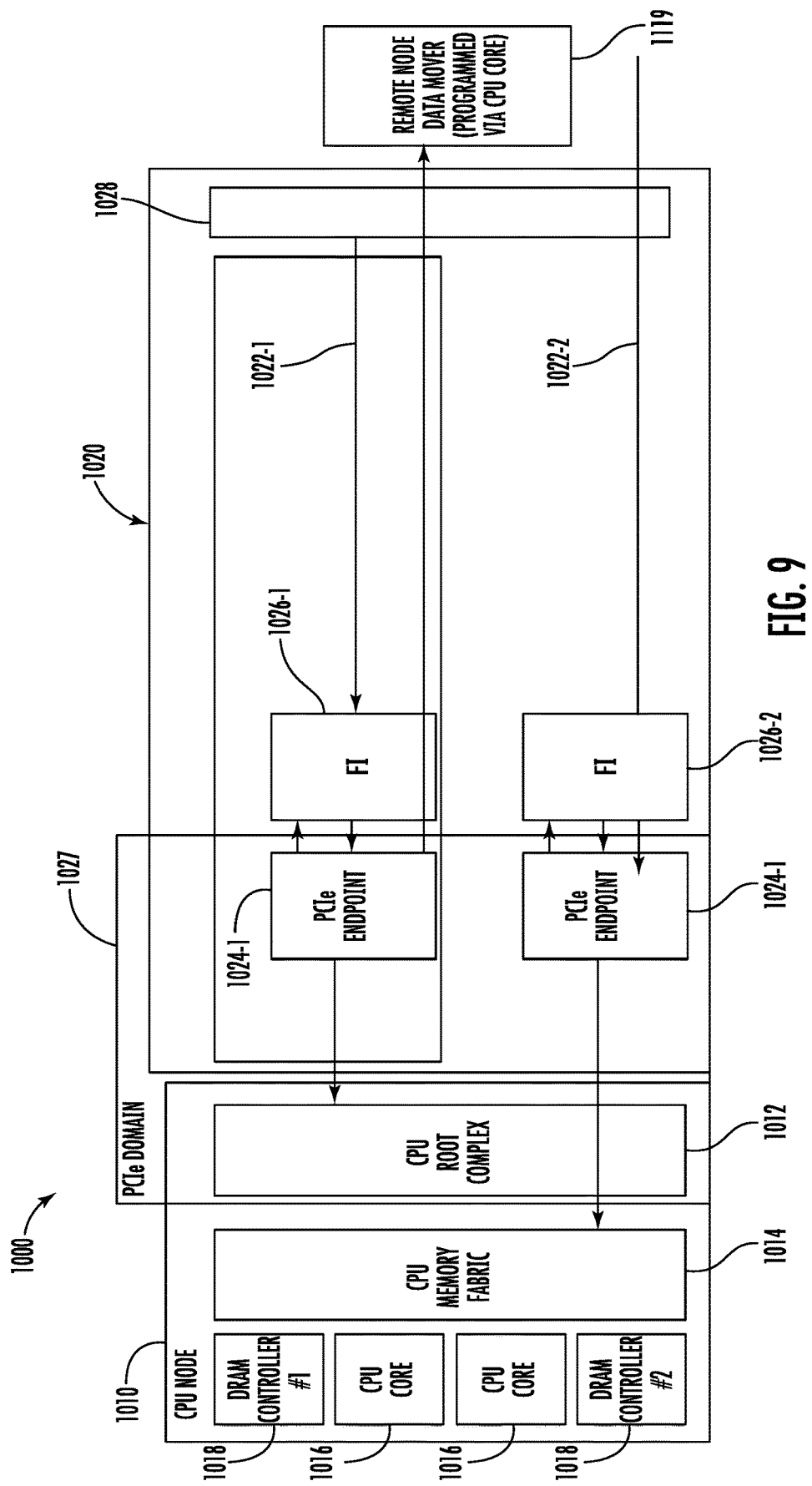
FIG. 9 is a block diagram of an example computing system.

FIG. 9 schematically illustrates portions of an example computing system 1000. Computing system 1000 comprises central processing unit (CPU) node 1010 and protocol converter 1020. CPU node 110 comprises a root complex 1012, a CPU memory fabric 1014, CPU cores 1016 and CPU memories 1018. The PCIe protocol converter 1020 comprises independent PCIe channels or links. 1022-1, 1022-2 (collectively referred to as links 22). Although converter 1020 is illustrated as comprising two independent PCIe links, converter 1020 may comprise greater than two links. For example, in one implementation converter 20 may comprise for independent PCIe links.

Each of links 1022 comprises an endpoint and a fabric interface. In the example illustrated, link 1022-1 comprises endpoint 1024-1 and fabric interface 1026-1. Likewise, link 1022-2 comprises endpoint 1024-2 and fabric interface 1026-2. Endpoints 1024 and the CPU complex 1012 form a PCIe domain 1027. The protocol converter further comprises a fabric switch 1028 that is connected to the fabric interfaces 1026-1, 1026-2 (collectively referred to as fabric interfaces 1026) and is further connectable to a remote node 10119, such as a CPU node that is operating according to a non-PCIe protocol. The fabric switch 1028 is to transmit writes of a single write request from the remote node 119 across or using both of links 1022.

Each fabric interface 1022 is to transmit an acknowledgment to the remote node 1119 in response to at least one of the writes becoming observable at the CPU node 1010. The remote node 119 is to use the acknowledgment, alone or in combination with other received acknowledgments for the write request, as a basis for indicating transmission completion of the single write request. Because the acknowledgments received by the remote node indicates that the corresponding writes have become observable at CPU node 1010, the flag or the indication of transmission completion of the write request cannot be transmitted before in entirety of the write request has become observable at CPU node 1010. As a result, data inconsistencies, caused by a flag or transmission completion being output and received by CPU node prior to all of the previously sent writes having become observable, are reduced or prevented.

In one implementation, each of interfaces 1026 comprises logic and/or a processor that carries out instructions contained in a non-transitory computer-readable medium that carries out method 200 described above. In one implementation, each of interfaces 1026 carryout method 500 described above. In one implementation, each of interfaces 1026 may carry out the write transmission process flows described above in FIG. 3, FIG. 4 and/or FIG. 6. In one implementation, each of interfaces 1026 comprises the above described interface 826.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A PCIe (Peripheral Component Interconnect Express) protocol converter for connection to a central processing unit (CPU) node having a root complex, a CPU memory fabric, and CPU memory, the PCIe protocol converter comprising:
    independent PCIe links, each respective link of the links comprising
        a respective endpoint for connection to the root complex; and
        a respective fabric interface connected to the respective endpoint; and
    a fabric switch connected to the fabric interface of each of the links and connectable to a remote node, wherein the fabric switch is to transmit writes of a single write request from the remote node across the links,
    wherein each fabric interface is to transmit an acknowledgment to the remote node in response to a write of the writes becoming observable at the central processing unit node; and
    wherein the fabric interface is to output a push communication to the CPU node following receipt and transmission of the write, wherein the push communication causes the CPU node to transmit a push response to the fabric interface in response to the write preceding the push communication becoming observable at the central processing unit and wherein the fabric interface transmits the acknowledgment in response to receipt of the push response.

2. The PCIe protocol converter of claim 1, wherein the acknowledgment is transmitted in response to a predefined plurality of writes becoming observable at the CPU node.

3. The PCIe protocol converter of claim 1, wherein the push communication comprises a tracking read request, wherein the push response comprises a read completion corresponding to the tracking read request and wherein the fabric interface transmits the acknowledgment in response to receiving the read completion.

4. The PCIe protocol converter of claim 1, wherein the push communication comprises a tracking read request including a forwarding address, wherein the push response comprises a forwarding of the tracking read request to the interface by the root complex in response to a write preceding the tracking read request becoming observable at the central processing unit, and
    wherein the fabric interface transmits the acknowledgment in response to receiving the forwarded tracking read request.

5. The PCIe protocol converter of claim 1, wherein the push communication comprises a tracking write request including a forwarding address, wherein the push response comprises a forwarding of the tracking write request to the interface by the root complex in response to a write preceding the tracking write request becoming observable at the central processing unit, and
    wherein the fabric interface transmits the acknowledgment in response to receiving the forwarded tracking write request.

6. The PCIe protocol converter of claim 1, wherein the fabric interface is to output the push communication in response to receipt and transmission of a number of the writes satisfying a numerical plural threshold.

7. The PCIe protocol converter of claim 6, wherein the fabric interface dynamically adjusts the numerical plural threshold during the single write request.

8. The PCIe protocol converter of claim 1, wherein the fabric interface is to determine a number of outstanding push communications, the outstanding push communications being those push communications for which a corresponding push response has not been received and wherein the fabric interface stops transmitting the first indications in response to the number of outstanding push communications exceeding a predefined threshold.

9. The PCIe protocol converter of claim 1, wherein the acknowledgment transmitted by the fabric interface is for oldest writes transmitted by the fabric interface independent of whether the oldest writes correspond to the push communication.

10. A computing system comprising:
a central processing unit (CPU) node comprising:
 a CPU core;
 a CPU memory;
 a CPU memory fabric connecting the CPU core and the CPU memory; and
 a CPU root complex connected to the CPU memory fabric;
 a non-PCIe (Peripheral Component Interconnect Express) fabric switch;
a first fabric interface connected to the CPU root complex and connected to the non-PCIe fabric switch; and
a second fabric interface connected to the CPU root complex and connected to the non-PCIe fabric switch,
wherein the non-PCIe fabric switch is to transmit writes of a single write request from a remote node across both of the first fabric interface and the second fabric interface, and
wherein the first fabric interface and the second fabric interface are each to transmit an acknowledgment to the remote node in response to at least one of the writes becoming observable at the CPU node, the acknowledgment being usable by the remote node as a basis for indicating transmission completion of the single write request; and
wherein the first fabric interface is to output a push communication to the CPU node following receipt and transmission of the at least one of the writes, wherein the push communication causes the CPU node to transmit a push response to the first fabric interface in response to a write preceding the tracking read request becoming observable at the CPU node and wherein the first fabric interface transmits the acknowledgment in response to receipt of the push response.

11. The computing system of claim 10, wherein the acknowledgment is transmitted in response to a predefined plurality of writes becoming observable at the CPU node.

12. The computing system of claim 10, wherein the push communication comprises tracking read request, wherein the push response comprises a read completion, corresponding to the tracking read request and wherein the first fabric interface transmits the acknowledgment in response to receiving the read completion.

13. The computing system of claim 10, wherein the push communication comprises a tracking read request including a forwarding address, wherein the push response comprises a forwarding of the tracking read request to the interface by the root complex in response to a write preceding the tracking read request becoming observable at the CPU node, and
 wherein the first fabric interface transmits the acknowledgment in response to receiving the forwarded tracking read request.

14. The computing system of claim 10, wherein the push communication comprises a tracking write request including a forwarding address, wherein the push response comprises a forwarding of the tracking write request to the interface by the root complex in response to a write preceding the tracking write request becoming observable at the CPU node, and
 wherein the first fabric interface transmits the acknowledgment in response to receiving the forwarded tracking write request.

15. The computing system of claim 10, wherein the first fabric interface is to output the push communication in response to receipt and transmission of a number of the writes satisfying a numerical plural threshold.

16. The computing system of claim 10, wherein the first fabric interface dynamically adjusts the numerical plural threshold during the single write request.

17. A PCIe (Peripheral Component Interconnect Express) write request acknowledgment method comprising:
 receiving, at a first PCIe fabric interface, first writes of a write request transmitted from a remote node across a non-PCIe fabric switch;
 transmitting, with the first PCIe fabric interface, the first writes to a PCIe CPU (central processing unit) node;
 transmitting a first acknowledgment, with the first PCIe fabric interface, to the remote node in response to the writes becoming observable at the central processing unit node, the acknowledgment being usable by the remote node as a basis for indicating transmission completion of the write request;
 receiving, at a second PCIe fabric interface, second writes of the write request transmitted from the remote node across the non-PCIe fabric switch;
 transmitting, with the second PCIe fabric interface, the second writes to the PCIe CPU node;
 transmitting a second acknowledgment, with the second PCIe fabric interface, to the remote node in response to the writes becoming observable at the central processing unit node, the second acknowledgment being usable by the remote node as a basis for indicating transmission completion of the write request;
 transmitting, from the first PCIe fabric interface, a push communication to the PCIe CPU node immediately following transmission of the first writes to the PCIe CPU node;
 receiving, with the first PCIe fabric interface, a push response corresponding to the push communication, from the PCIe CPU node, wherein the transmission of a first acknowledgment is in response to receipt of the push response;
 transmitting, from the second PCIe fabric interface, a second push communication to the PCIe CPU node immediately following transmission of the second writes to the PCIe CPU node; and
 receiving, with the second PCIe fabric interface, a second push response corresponding to the second push communication, from the PCIe CPU node, wherein the transmission of a second acknowledgment is in response to receipt of the second push response.

* * * * *